(12) United States Patent
Elo et al.

(10) Patent No.: US 7,174,371 B2
(45) Date of Patent: Feb. 6, 2007

(54) DYNAMIC PORT CONFIGURATION OF NETWORK EQUIPMENT

(75) Inventors: Anders Elo, Södertälje (SE); Andreas Öman, Bagarmossen (SE); Magnus Lundström, Hägersten (SE)

(73) Assignee: Packetfront Sweden AB, Hagersten (SE)

( * ) Notice: Subject to any disclaimer, the term of this patent is extended or adjusted under 35 U.S.C. 154(b) by 658 days.

(21) Appl. No.: 10/333,048

(22) PCT Filed: Oct. 7, 2002

(86) PCT No.: PCT/SE02/01822

§ 371 (c)(1),
(2), (4) Date: Sep. 29, 2003

(87) PCT Pub. No.: WO2004/006503

PCT Pub. Date: Jan. 15, 2004

(65) Prior Publication Data

US 2004/0073600 A1   Apr. 15, 2004

(51) Int. Cl.
*R06F 15/16* (2006.01)
(52) U.S. Cl. ..................................... 709/220
(58) Field of Classification Search ............... 709/220, 709/223, 230, 238

See application file for complete search history.

(56) References Cited

U.S. PATENT DOCUMENTS

| | | | | |
|---|---|---|---|---|
| 6,289,377 B1* | 9/2001 | Lalwaney et al. | | 709/222 |
| 6,608,832 B2* | 8/2003 | Forslow | | 370/353 |
| 6,657,991 B1* | 12/2003 | Akgun et al. | | 370/352 |
| 6,697,360 B1* | 2/2004 | Gai et al. | | 370/389 |
| 6,876,667 B1* | 4/2005 | Synnestvedt et al. | | 370/466 |
| 7,096,273 B1* | 8/2006 | Meier | | 709/236 |

FOREIGN PATENT DOCUMENTS

| | | |
|---|---|---|
| WO | 9826520 | 6/1998 |
| WO | 0944922 | 6/2002 |

* cited by examiner

Primary Examiner—David Y. Eng

(57) ABSTRACT

The invention provides an arrangement and a method with dynamic port configuration of network equipment for communication in a broadband network. A central managing database in connection with a Dynamic Host Configuration Protocol server is keeping templates with recordings of network equipment parameters for their physical port settings and deployed services. Hence, enabling dynamic updating of port settings by conveying parameter recordings from the Dynamic Host Configuration Protocol server. The parameter settings are updated in the intermediate means.

24 Claims, 1 Drawing Sheet

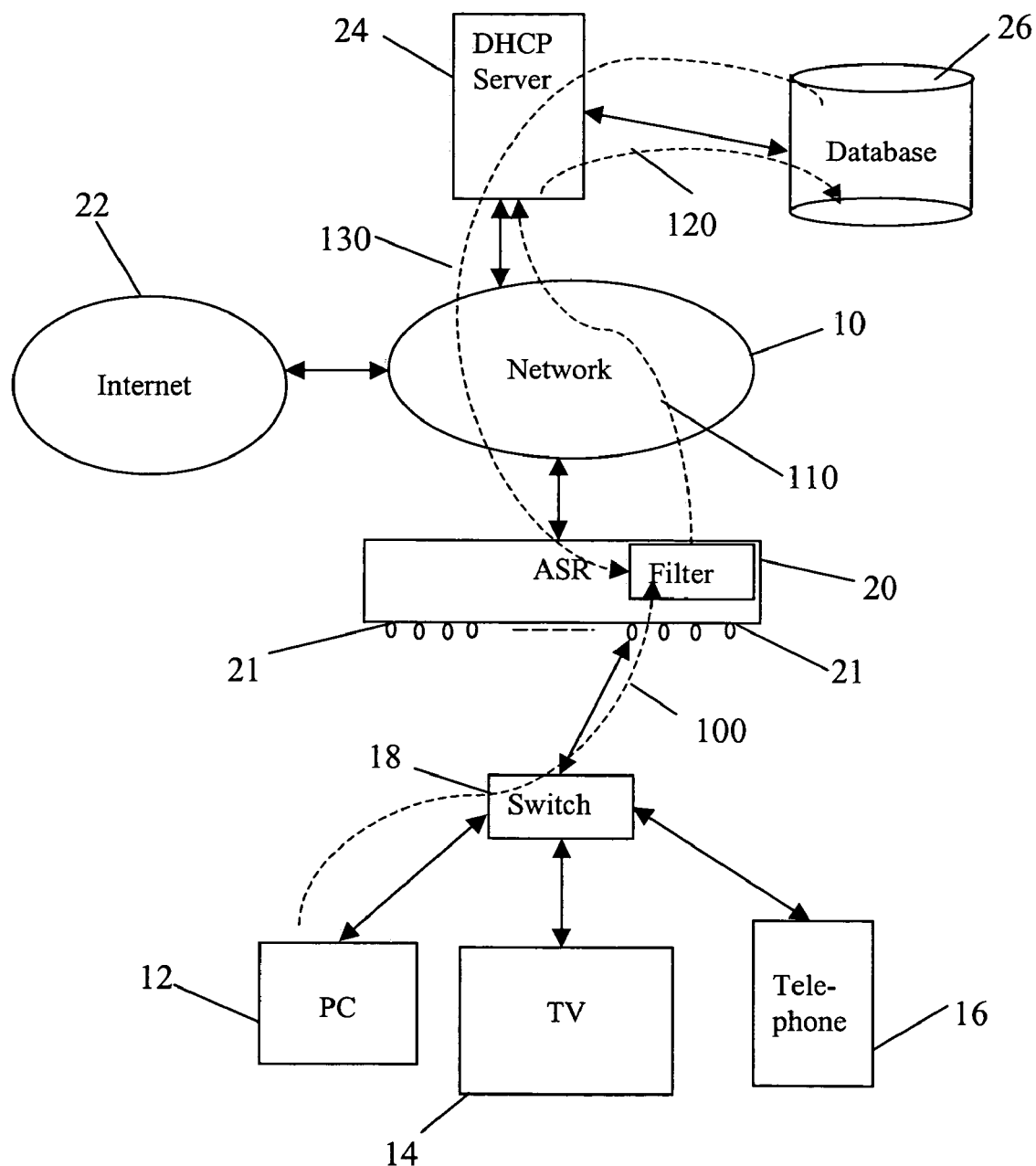
Fig.

DYNAMIC PORT CONFIGURATION OF NETWORK EQUIPMENT

This application claims benefit to PCT application No. PCT/SE02/01822, filed 7 Oct. 2002, as well as U.S. provisional patent application Ser. No. 60/394,600, both hereby incorporated by reference.

BACKGROUND OF THE INVENTION

1. Technical Field

The present invention pertains to an arrangement and a method for dynamic port configuration of network equipment for communication in a broadband network, specifically through the dynamic host configuration protocol (DHCP) server and in accordance with the present invention a central managing database.

2. Description of Related Art

During the past few years, broadband networks have grown steadily. A number of network elements, typically routers, switches, DSLAM (Digital Subscriber Line Access Multiplexer) and other types of equipment are utilized to provide broadband services.

Traditional dial-up services consist of a smaller number of centrally placed modem servers that an end-user or client/customer applies the telephone system to dial into. But with broadband networks, the equipment connecting the end-user has to be located much closer to the actual location of the end-user. This location is, for example, typically in the basement of an apartment building, or in a location within a few hundred meters of single-homes.

Each network element typically connects from 10 to 100 end-users at most. And this naturally means that there will be numerous network elements in any fairly large sized broadband network. This introduces a number of problems, like:

- The huge number of network elements should have a similar configuration to make the administration of equipment easier.
- The network elements require man-resources for administration and deployment.
- End-users have different demands for quality and functionality, which leads to special configuration for some users.
- Limitations in how network elements are maintained makes introduction of new services requiring additional configuration cumbersome.

These problems often lead to a lot of resources being spent on maintaining and adjusting network element configuration to cope with demands from customers. These problems are more readily understood through an example.

Assuming a network with 100,000 customers and network-elements with a typical port-density of 24 ports. If each customer is assigned one port there will be just over 4000 network elements in such a network.

Hereby, offering an Internet access service with two choices for connection speed (500 kbit/s and 2000 kbit/s) where the connection speed is configured on the port connecting to the customer. Off the shelf network equipment today requires that a network operator logs into network equipment, enters configuration mode and sets the port speed to whatever a customer has ordered. This naturally implies that when customers upgrade, downgrade, subscribe or unsubscribe from the service port configuration on the 4000 network elements, they have to be constantly updated. A port cannot be open unless there is an active subscriber, and the port must not be set to a port speed higher than what the subscriber is paying for.

If other services, requiring yet other configuration parameters, are available in the network, the complexity grows even more. When a customer calls in to order a service, the port where the customer is connected has to be identified. The appropriate configuration for the service has to be designed and then applied in the network. Configuring a specific network element has to be accomplished manually by a person. It is frequently a requirement of a network operator to maintain as few standardized configuration templates as possible to simplify the task of network administration.

Prior art provides that an end-user has to make a phone call to the broadband operator, and verbally ask for a new parameter setting. Thereby, the operator manually through, for example, a PC has to re-program the router in question for this new request changing the parameter settings for an end-user PC port. It is thus easily understood how huge workloads the operator staff can encounter, especially for end-users whose demands for dynamic parameter settings are frequent, and with regard to the possibility of having, as an example, 100 000 end-users in their broadband network.

Applying a customer specific configuration for each customer quickly grows out of proportion when it comes to keeping records about who got which configuration for what reason. This means that the introduction of new services or exceptions to the existing services can cause problems.

Several problems are thus issued, such as:
- Customer identification; where in the network is the customer located?
- Configuration template identification; the configuration template for the service the customer subscribes to has to be identified.
- Configuration template adjustment; the template typically has a few parameters that have to be adjusted such as e.g. customer network address, port speed settings, etc.
- Configuration deployment; the network element connecting the customer has to receive new configuration parameters.

SUMMARY OF THE INVENTION

An aim of the present invention is to solve problems mentioned and others related to configuration of network equipment in a broadband network. For this purposes the present invention sets forth an arrangement for dynamic port configuration of network equipment for communication in a broadband network. It thus comprises:

- a network intermediate means connecting end-user equipment, having a MAC address, to the network through ports:
- a means for activating a DHCP relay agent in the network intermediate means;
- a filter in the network intermediate means filtering by capturing all broadcasted packets from end-user equipment to a DHCP server, packets from a network DHCP server and relay agent packets;
- in the network intermediate means the relay agent deploying remote-id and circuit-id relay options adding information to the packet about a unique MAC address of the end-user equipment and physical port where the packet is received, thus enabling the network DHCP server to uniquely identify, through the relay agent and port-id, to which network intermediate means the end-user equipment is connected;

a central managing database reachable through the network intermediate means and in connection with the DHCP server keeping templates with recordings of end-user service parameters for intermediate means port settings, thus enabling dynamic updating of intermediate means port settings by conveying the recordings from the central managing database through a protocol means, recognizing the MAC address to the network intermediate means through a relay agent packet to the network intermediate means and updating the parameters for intermediate means port settings.

In one embodiment it is provided that the intermediate means filter masquerades the DHCP server address when capturing packets by replacing it with the network intermediate means address when communicating with end-user equipment, enabling the network intermediate means to take the role of the DHCP server in responding to DHCP renewals even if the central DHCP server does not respond thereby increasing service availability.

Another embodiment enables the network intermediate means to conceal the true DHCP server address, which increases network security, as the DHCP server becomes less exposed.

A further embodiment provides that a DHCP snooping feature enables the network intermediate means capturing a packet, whereby options contained in the DHCP packet can be replaced by the intermediate means filter for the purpose of upholding a communication with the DHCP server by ensuring that the remote-id/circuit-id are actually delivered to the DHCP-server.

A still further embodiment provides that the original packet before being replaced is stored, thus when receiving a reply from the DHCP server, the network intermediate means reinstalling original options before forwarding the reply to the end-user equipment.

Yet a further embodiment provides that the central management database is able to policy decisions including at least the following of them:
  if an address is granted at all at this time; and
  if configuration parameters should be installed in some other network element as a result of an end-user address request. Such configuration parameters, in one embodiment are at least one of the following:
    packet filters;
    rate-limiting;
    packet priority processing; and access control to multicast groups.

A further embodiment provides that information about an assigned IP address, learned through the DHCP, enables the network intermediate means to inject a host route to the assigned address into its routing table. Thus, the host route can be announced by IGP (Interior Gateway Protocol) or EGP (Exterior Gateway Protocol) protocols to other routers, enabling them to learn a specific route to a local destination.

Yet a still further embodiment comprises that the parameters f or intermediate means port settings are enabling or disabling configuration at a specific date/time.

Yet another embodiment provides that the recordings in the management database record billing, security and other services that have been deployed to a customer at any given time.

A further embodiment comprises that the recordings determine the connection speed to the network at any given time.

Another embodiment comprises that an end-user equipment connects to the central managing database through an end-user interface to the templates in order to change the parameters for intermediate means port settings.

Furthermore, the present invention sets forth a method for dynamic port configuration of end-user equipment for communication in a broadband network. It thus comprises the steps of:
connecting end-user equipment, having a MAC address, through a network operator intermediate means having ports;
activating a DHCP relay agent residing in the network operator intermediate means;
filtering in the network operator intermediate means by capturing all broadcasted packets from end-user equipment to a DHCP server, packets from a network DHCP server and relay agent packets;
deploying in the network operator intermediate means through the relay agent remote-id and circuit-id relay options adding information to the packet about a unique MAC address of the end-user equipment and physical port where the packet is received, thus enabling the network DHCP server to uniquely identify, through the relay agent and port-id, to which network operator intermediate means the end-user equipment is connected;
keeping templates through a central managing database, reachable through the network operator intermediate means in connection with the DHCP server, with recordings of intermediate means parameters for their physical port settings and deployed services, thus enabling dynamic updating of port settings by conveying the recordings from the central managing database through a protocol means, recognizing the address to the network operator intermediate means through a relay agent packet to the intermediate means and updating the intermediate means parameters for the physical port settings.

Further method steps are set forth in the attached set of dependent method claims, which adhere to the mentioned embodiments of the present invention.

BRIEF DESCRIPTION OF THE DRAWINGS

Henceforth reference is had to the following description taken in conjunction with the accompanying drawing, together with given examples and embodiments for a better understanding of the present invention, in which the single FIGURE:

BRIEF DESCRIPTION OF THE SOLE FIGURE

A sole FIGURE schematically illustrates an end-user connecting to a broadband network in accordance with the present invention.

TABLES

The following tables are attached and found at the end of the present description, in which:
Table 1 depicts the DHCP message format and its field descriptors; and
Table 2 depicts the definition of its field descriptors.

DETAILED DESCRIPTION OF THE INVENTION

In order to be able to communicate using the Internet Protocol a host has to have a set of parameters. This includes a unique IP address, a subnet mask of the subnet to which the host is connected, a default-gateway for communication outside the local subnet and optionally a name server address for translation between Internet names (www.packetfront.com) and the corresponding IP address of a host. The Dynamic Host Configuration Protocol (DHCP) allows this configuration information to be assigned to a host at startup. An alternative is to have the configuration statically configured on the host.

The primary advantage of dynamically configuring these parameters is a simplified network administration, if renumbering is necessary the configuration is accomplished on the DHCP server and the host has to reboot to obtain new parameters, and thus a more efficient use of address space is accomplished. A host returns the address when disconnecting from the network meaning that the address immediately becomes available for assignment to another host.

DHCP consists of two components a protocol for delivering host-specific configuration parameters from a DHCP server to a host and a mechanism for allocation of network addresses to hosts. In addition to the basic configuration parameters described above, the DHCP may also deliver additional configuration information to the host. One feature of the protocol is the use of a DHCP relay agent. A relay agent is a software program, for example, residing in a router, which supplements information in a DHCP packet and sends the packet from, for example, a router to the DHCP server.

In accordance with the present invention, the relay agent supplements information about remote-id and circuit-id before a packet is forwarded to the DHCP server. By utilizing the relay agent it is possible to centralize the DHCP server operation so that each physical subnet does not have to contain its own DHCP server. DHCP is built on a client-server model, where designated DHCP servers allocate network addresses and deliver configuration parameters to dynamically configured hosts. DHCP is working on the network layer in the OSI model.

The present information regarding DHCP has been collected from relevant DHCP RFC documents (Request For Comment documents). RFC is for the development of TCP/IP standards and controlled by the Internet Engineering Task Force (IETF).

There are three mechanisms for IP address allocation supported by DHCP:
  Automatic allocation—A permanent IP address is assigned to the end-user by DHCP.
  Dynamic allocation—An IP address with a limited lease time is assigned to the end-user.
  Manual allocation—Allows a network administrator to assign a specific IP address to the end-user.

The format of DHCP messages is based on the format of BOOTP messages, to capture the BOOTP relay agent behavior which allows interoperability of existing BOOTP clients with DHCP servers. Utilizing BOOTP relay agents eliminates the necessity of having a DHCP server on each physical network segment. The Bootstrap Protocol (BOOTP) is explained in RFC951, Bootstrap Protocol. W. J. Croft, J. Gilmore. Sep. 01, 1985. Further information about the BOOTP can be extracted from updates by RFC1395, RFC1497, RFC1532, RFC1542. RFC documents can be retrieved from http://www.rfc-editor.org.

The attached Table 1 depicts the DHCP message format, and the field descriptors are depicted through Table 2, both found at the end of the present description as described in RFC2131.

For a more detailed description regarding the DHCP message format it is referred to RFC 2131—Dynamic Host Configuration Protocol.

In the interaction between an end-user and the DHCP server the following messages are used:
  DHCPDISCOVER—Client broadcast to locate available servers.
  DHCPOFFER—Server to client in response to DHCPDISCOVER with offer of configuration parameters.
  DHCPREQUEST—Client message to servers either
    (a) requesting offered parameters from one server and implicitly declining offers from all others,
    (b) confirming correctness of previously allocated address after, e.g., system reboot, or
    (c) extending the lease on a particular network address.
  DHCPACK—Server to client with configuration parameters, including committed network address.
  DHCPNAK—Server to client indicating client's notion of network address is incorrect (e.g., client has moved to new subnet) or client's lease has expired
  DHCPDECLINE—Client to server indicating network address is already in use.
  DHCPRELEASE—Client to server relinquishing network address and cancelling remaining lease.
  DHCPINFORM—Client to server, asking only for local configuration parameters; client already has externally configured network address.

The following is an example of a common prior art communication between an end-user (Host A) and a DHCP server.

| Host A | DHCP server |
|---|---|
| DHCPDISCOVER ----→ | Broadcast |
|  | Unicast ←---- DHCPOFFER |
| DHCPREQUEST ----→ | Broadcast |
|  | Unicast ←---- DHCPACK |

If more than one DHCP server is responding on an end-users DHCP discover packet, due to multiple DHCP server configuration, the client can request either one of the DHCP offers by answering with a DHCP request. But usually the client requests the IP address from the first DHCP offer packet that it receives.

Just because a DHCP server is offering an IP address to an end-user it is not assured that the client receives that address. The server could have offered the same IP address to more than one client, but usually the server reserves the offered IP address until the client has had a chance to respond.

If a server and client are on different physical subnets the DHCP requests and replies have to be relayed. Relay agents tamper with the header in the incoming DHCP request, changing the gateway IP address field, before forwarding the packet out on another interface towards the DHCP server. The DHCP Relay Agent information is available through RFC 3046 DHCP Relay Agent Information Option. M. Patrick. January 2001.

If a relay agent receives a packet with the gateway IP address field (within the header) containing 0.0.0.0, it is the closest relay agent to the client.

The DHCP relay agent is a DHCP option which has two sub-options:
  Agent Circuit ID sub-option
  Agent Remote ID sub-option This sub-option may be added by DHCP relay agents, which terminate switched or permanent circuits. It encodes an agent-local identifier of the circuit from which a DHCP client-to-server packet was received. Agents in relaying DHCP responses back to the proper circuit intend it for use. Possible uses of this field include:
- Router interface number
- Switching Hub port number
- Remote Access Server port number
- Frame Relay DLCI
- ATM virtual circuit number
- Cable Data virtual circuit number Servers may use the Circuit ID for IP and other parameter assignment policies. The Circuit ID should be considered an opaque value, with policies based on an exact string match only; that is, the Circuit ID should not be internally parsed by the server. An opaque value is defined by that it should be left as it is, i.e., not be modified by an intermediate system.

The DHCP server should report the Agent Circuit ID value of current leases in statistical reports including its Management Information Base (MIB) and it logs. Since the Circuit ID is local only to a particular relay agent, a circuit ID should be qualified with the giaddr value, see tables, which identifies the relay agent.

This sub-option may be added by DHCP relay agents which terminate switched or permanent circuits and have mechanisms to identify the remote host end of the circuit. The Remote ID field may be used to encode, for instance:
- a "caller ID" telephone number for dial-up connection
- a "user name" prompted for by a Remote Access Server
- a remote caller ATM address
- a "modem ID" of a cable data modem
- the remote IP address of a point-to-point link
- a remote X.25 address for X.25 connections The remote ID has to be globally unique.

DHCP servers may use this option to select parameters specific to particular users, hosts, or subscriber modems. The option should be considered an opaque value, with policies based on exact string match only; that is, the option should not be internally parsed by the server. The relay agent may use this field in addition to or instead of the Agent Circuit ID field to select the circuit on which to forward the DHCP reply (e.g., Offer, Ack, or Nak). DHCP servers should report this value in any reports or MIBs associated with a particular client.

The solution in accordance with the present invention provides that DHCP is used to deliver configuration information to the end-user (customers, clients) equipment (PC, host etc.) through an intermediate means, such as a router, switch or the like, parameter settings. The invention extends the use of remote-id and circuit-id options added to the DHCP packets to include identification of configuration parameters to be installed in an intermediate device (router or switch), thus enabling the network equipment connecting the end-user to the network to be dynamically configured with the service parameters required to provide the end-user with its selected service whenever the end-user connects its host to the network.

For a more comprehensive understanding of the present description, the network element or intermediate means connecting the end-user/client is referred to as an Access Switch Router (ASR) but the present invention itself is not limited only to such a device.

The attached single FIGURE schematically illustrates a traffic path in a network 10 arrangement in accordance with the present invention. It depicts typical equipment e.g. a PC 12, TV-set 14, telephone 16 connected to a residential broadband network 10. A double pointed arrow indicates the direction of signaling and data traffic. In this example with three devices 12, 14, 16 connected to one end-user equipment port, a switch 18 directs data traffic to an ASR 20.

Moreover, the residential network 10 has a connection (not shown) to other networks such as Internet 22. Further depicted in the FIGURE is the DHCP server 24, which is in connection with a central management database 26, in accordance with the present invention, storing templates with records containing parameter settings for end-user equipment ports in the ASR 20.

In the following, one embodiment in accordance with the present invention, involving the PC 12 requesting an IP address, is described with reference to the attached FIGURE. Single broken line arrows with reference numerals indicate the steps taken in order to receive an IP address and a correct ASR 20 parameter setting in accordance with the present invention.

Client/end-user/customer requests 100 an IP address through his PC 12 by broadcasting the request (DHCP). An ASR 20 filter in accordance with the present invention captures/snoops/intercepts it. The ASR 20 filter DHCP relay options identifies 110 the end-user equipment MAC-address and port-id 12 and conveys the IP address request to the DHCP server 24. Hence in accordance with the present invention, the DHCP server 24 is connected to a central management database 26, storing templates with parameter settings for the ASR 20 port connecting to the end-user. Parameters can be of the type which services are requested by the end-user, broadband connection speeds e.g. 500 kbit/sek or 2000 kbit/sek, time periods settings for different services, for example different connection speeds related to day and night communication etc.

The filter in accordance with the present invention resides in the ASR or other equipment making up an intermediate means, whereby it monitors all traffic to and from it and captures all packets from the UDP port 68 and/or to the UDP port 67 (UDP, User Datagram Protocol). These ports are defined as standards in DHCP.

Prior art provides that the end-user has to make a phone call to the broadband operator, and verbally ask for a new parameter setting. Thereby, the operator manually through, for example, a PC has to re-program the ASR 20 for this new request changing the parameter settings for the end-user PC 12 port. It is thus easily understood how huge workloads the operator staff can encounter, especially for end-users whose demands for dynamic parameter settings are frequent, and with regard to the possibility of having, as an example, 100,000 end-users in their broadband network.

The DHCP server 24 checks the central management database 26 for a template with parameter settings that match the specific end-user and its equipment 12, 14, 16, and the database 26 locates the end-users services. After completing the match, the database returns information to the DHCP server 24, which responds to the end-user equipment (PC 12). When the ASR 20 intercepts the DHCP offer to the client, it contacts the central database 26 through a suitable protocol such as COPS (Common Open Policy Server) and/or FTP (File Transfer Protocol) to request configuration for the end-user port. The database sends a dynamic configuration to the ASR 20 and its filter, whereby the port settings for the end-user equipment 12 is set in accordance with the dynamic configuration of the present invention. The PC 12 now having an IP address and parameter settings as once requested through the template in the database 26 and establishes communication, for example with the Internet 22.

The database 26 templates can be changed or updated on end-user preferences whenever wanted, for example, by accessing the database 26 and bring about the template on the PC 12 screen and fill out a template form for new settings. This end-user database communication can take place through the Internet.

One embodiment of the present invention sets forth an arrangement for dynamic port configuration of network equipment for communication in a broadband network. The arrangement comprises a network intermediate means 20, for example, an ASR connecting end-user equipment 12, 14, 16, which has a MAC address, to the network through ports 21. It also comprises a means for activating a DHCP relay agent in the intermediate means, and a filter in the intermediate means filtering all broadcasted packets from end-user equipment to a network DHCP server and/or vice versa by capturing them.

In the intermediate means 20, the relay agent deploys remote-id and circuit-id relay options adding information about a unique MAC address of the end-user equipment and physical port, where the packet is received, to the packet. Hence, enabling the network DHCP server to uniquely identify, through the port-id, where the end-user equipment is situated in the network.

Furthermore it comprises a central managing database 26 reachable through the end-user equipment 12, 14, 16 and in connection with the DHCP server keeping templates with recordings of end-user equipment parameters for their physical port settings and deployed services. This enables dynamic updating of port settings by conveying the parameter recordings from the database 26 through a protocol means, recognizing the address to the intermediate means through the relay agent packet, to the intermediate means 20.

In the solution in accordance with the present invention, the ASR filters all User Datagram Protocol packets (UDP packets), as mentioned, are destined for UDP port 67 and 68. This allows the ASR to capture—or snoop—all DHCP packets between the end-user and the central DHCP server. The ASR is designed to work as a relay agent using the remote-id and circuit-id relay agent options to add information about the unique ethernet MAC-address of the source and physical port (interface) where the DHCP packet was received. This enables the central DHCP server to uniquly identify the end-user. The port-id is unique in the network because only that port exist on only one ASR. The MAC address is world unique, but if forged, it is still unique on that particular port.

By additional features in the DHCP snooping algorithm and the central DHCP server system in accordance with the present invention, it is possible to address other issues of updating network element configuration with customer specific parameters based on configuration templates stored at a central location 26. Such a configuration template may be unique for a single customer, or may be used to provide a common service to a great number of customers.

Important for this solution is that the configuration template is administrated in one central system and deployed into the network by computer control at the moment when the customer connects to the network (by requesting a network address).

The solution as a whole thereby solves the issues of uniquely identifying the customer, the customer location in the network, the configuration to be applied, the modifications to that configuration necessary for the individual customer and the deployment of the configuration to the appropriate network element(s) in the network.

In addition to standard relay agent operation, with relay agent options as described, the ASR DHCP snooping enables the following features.

It enables a feature, which accomplishes it to masquerade the DHCP server address and replace it with the ASR address in the communication with the end-user. This enables the ASR to take the role of the DHCP server in responding to DHCP renewals even if the central DHCP server does not respond thereby increasing service availability. It further enables the ASR 20 to conceal the true DHCP server address which increase network security as that system becomes less exposed.

The information about an assigned IP addresses enables the ASR 20 to inject a host route to the assigned address into its routing table. This host route can then be announced by IGP or EGP protocols to other routers, enabling them to learn a specific route to the local destination. IGP and EGP are Internet protocols for exchanging routing information within and between autonomous systems.

If there are one or multiple forwarder(s) between the requesting end-user and the ASR, the DHCP snooping feature will still enable the ASR to intercept the packet. Any options contained in the DHCP packet can be replaced by the ASR for the purpose of upholding a communication with the DHCP server by securing that the remote-id/circuit-id are actually delivered to the DHCP-server. When the reply is received the ASR can reinstall the original options (kept from the original packet) before forwarding the reply to the end-user.

This feature is particularly useful, but not limited to, when the relay agent option is already present in the DHCP packet from the end-user. An intermediate device may have added the information with-or-without purpose, but the ASR feature intervenes and ensures that the correct circuit-id and remote-id information is sent to the DHCP server.

The central management system is also able to make a number of policy decisions including but not limited to the following:

If address is granted at all at this time.

If configuration parameters should be installed in some other network element as a result of this end-user address request.

Such configuration parameters can be, but are not limited to the following:

Packet filters.

Rate-limiting.

Packet priority processing.

Other configuration parameters such as access control to multicast groups (i.e. controlling which multicast groups the particular end-user on the particular port is allowed to join)

By maintaining information about assigned addresses in the database, the central management system can, based on this knowledge, dynamically reconfigure network elements in a timely fashion as required, for instance, enabling or disenabling configuration at a specific date/time. It also enables the network management system to keep track of, for billing, security and other purposes, which services that have been deployed to which customer at any given time.

Although the advantages of the present invention have been described through given examples and embodiments, it is not limited to those. The attached set of claims provides further embodiments for a person skilled in the art.

TABLE 1

```
1               8              16             24             32
+-+-+-+-+-+-+-+-+-+-+-+-+-+-+-+-+-+-+-+-+-+-+-+-+-+-+-+-+-+-+-+-+
|    OP (1)    |   htype (1)  |   hlen (1)   |   hops (1)   |
+--------------+--------------+--------------+--------------+
|                           xid (4)                         |
+---------------------------+-------------------------------+
|          secs (2)         |           flags (2)           |
+---------------------------+-------------------------------+
|                          ciaddr (4)                       |
+-----------------------------------------------------------+
|                          yiaddr (4)                       |
+-----------------------------------------------------------+
|                          siaddr (4)                       |
+-----------------------------------------------------------+
|                          giaddr (4)                       |
+-----------------------------------------------------------+
|                                                           |
|                          chaddr (4)                       |
|                                                           |
|                                                           |
+-----------------------------------------------------------+
|                          sname (64)                       |
+-----------------------------------------------------------+
|                          file (128)                       |
+-----------------------------------------------------------+
|                       options (variable)                  |
+-----------------------------------------------------------+
```

TABLE 2

| FIELD | DESCRIPTION |
|---|---|
| Op | Message opcode/message type<br>1 - BOOTREQUEST, 2 - BOOTREPLY |
| Htype | Hardware address type, se ARP section in "Assigned Numbers" RFC; (e.g. '1' = 10 mb Ethernet) |
| Hlen | Hardware address length (e.g. '6' for 10 mb Ethernet) |
| Hops | Client sets to zero, optionally used by relay agents when booting via a relay agent. |
| Xid | Transaction ID, a random number chosen by the client, used by the client and server to associate messages and responses between them. |
| Secs | Set by the client; Seconds elapsed since client began address acquisition or renewal process. |
| Flags | Flags (not shown) |
| Ciaddr | Client IP address; only filled in if client is in BOUND, RENEW or BINDING state and can respond to ARP request. |
| Yiaddr | 'Your' (client) IP address |
| Siaddr | IP address of next server to use in bootstrap; returned in DHCPOFFER and DHCPACK by server. |
| Giaddr | Relay agent IP address, used in booting via a relay agent. |
| Chadder | Client hardware address |
| Sname | Optional server host name, NULL terminated string |
| File | Boot file name, null terminated string; "generic" name or NULL in DHCPDISCOVER, fully qualified directory path name in DHCPOFFER |
| Options | Optional parameters field. |

The invention claimed is:

1. An arrangement for dynamic port configuration of network equipment for communication in a broadband network, characterized in that it comprises:

a network operator intermediate means connecting end-user equipment, having a Media Access Control address, to the network through ports;

a means for activating a Dynamic Host Configuration Protocol relay agent in said network operator intermediate means;

a filter in the network operator intermediate means filtering by capturing all broadcasted packets from end-user equipment to a network dynamic host configuration protocol server (24), packets from the network DHCP server and relay agent packets;

in said network operator intermediate means said relay agent deploying remote-id and circuit-id relay options adding information to the packet about a unique Media Access Control address of the end-user equipment and physical port where the packet is received, thus enabling the network Dynamic Host Configuration Protocol server to uniquely identify, through a relay agent packet and port-id, where the intermediate means resides in the network and thus the end-user equipment;

a central managing database in connection with the Dynamic Host Configuration Protocol server, reachable through said network operator intermediate means, keeping templates with recordings of network equipment parameters for their physical port settings and deployed services, thus enabling dynamic updating of port settings by conveying said recordings from said central managing database through a protocol means, recognizing the address to the network operator intermediate means through a relay agent packet to said network operator intermediate means and updating the parameters for intermediate port settings.

2. An arrangement according to claim 1, characterized in that the network operator intermediate means filter masquerades the Dynamic Host Configuration Protocol server address when capturing packets by replacing it with the network operator intermediate means address when communicating with the network operator intermediate means, enabling the network operator intermediate means to take the role of the Dynamic Host Configuration Protocol server in responding to Dynamic Host Configuration Protocol renewals even if the central Dynamic Host Configuration Protocol server does not respond, thereby increasing service availability.

3. An arrangement according to claim 2, characterized in that the arrangement enables the network operator intermediate means to conceal the true Dynamic Host Configuration Protocol server address which increases network security as the Dynamic Host Configuration Protocol server becomes less exposed.

4. An arrangement according to claim 1, characterized in that a Dynamic Host Configuration Protocol snooping feature enables the network operator intermediate means capturing a packet, whereby options contained in the Dynamic Host Configuration Protocol packet can be replaced by the network operator intermediate means filter for the purpose of communication with the Dynamic Host Configuration Protocol server.

5. An arrangement according to claim 4, characterized in that an original packet before being replaced is stored, thus when receiving a reply from the Dynamic Host Configuration Protocol server, the network operator intermediate means reinstalling original options before forwarding the reply to the end-user equipment.

6. An arrangement according to claim 1, characterized in that the central management database is able to policy decisions including at least the following:

if an address is granted at all at this time; and if configuration parameters should be installed in some other network element as a result of an end-user address request.

7. An arrangement according to claim 6, characterized in that such configuration parameters are at least one of the following:

packet filters;

rate-limiting;

packet priority processing; and access control to multicast groups.

8. An arrangement according to claim 1, characterized in that information about an assigned IP address, through the Dynamic Host Configuration Protocol enables the network operator intermediate means to inject a host route to the assigned address into its routing table, whereby the host route can be announced by Interior Gateway Protocol or Exterior Gateway Protocol protocols to other routers, enabling them to learn a specific route to a local destination.

9. An arrangement according to claim 1, characterized in that the parameters for the intermediate port settings are enabling or disabling configuration at a specific date/time.

10. An arrangement according to claim 1, characterized in that said recordings in said management database record billing, security and other services that have been deployed to a customer at any given time.

11. An arrangement according to claim 1, characterized in that the connection speed to the network at any given time is determined by said recordings.

12. An arrangement according to claim 1, characterized in that an end-user equipment connects to said central managing database through an end-user interface to said templates in order to change the parameters for the intermediate port settings.

13. A method f or dynamic port configuration of network equipment for communication in a broadband network, characterized in that the method comprises the steps of:

connecting end-user equipment through a network operator intermediate means, having a Media Access Control address, to the network through ports;

activating a Dynamic Host Configuration Protocol relay agent in said network operator intermediate means;

filtering in the network operator intermediate means, by capturing all broadcasted packets from end-user equipment to a DHCP server, packets from a network DHCP server and relay agent packets;

deploying in said network operator intermediate means through said relay agent remote-id and circuit-id relay options adding information to the packet about a unique Media Access Control address of the end-user equipment, and physical port where the packet is received, thus enabling the network Dynamic Host Configuration Protocol server to uniquely identify, through the relay agent and port-id, where the network operator intermediate means resides in the network and thus the end-user equipment;

keeping templates through a central managing database, reachable through said network operator intermediate means in connection with the Dynamic Host Configuration Protocol server, with recordings of network equipment parameters for their physical port settings and deployed services, thus enabling dynamic updating of port settings by conveying said recordings from said central managing database through a protocol means, recognizing the address to the network operator intermediate means through a relay agent packet to said network operator intermediate means updating the parameters for the intermediate port settings.

14. A method according to claim 13, characterized in that the network operator intermediate means filter masquerades the Dynamic Host Configuration Protocol server address when capturing packets by replacing it with the intermediate means address when communicating with the network operator intermediate means, enabling the network operator intermediate means to take the role of the Dynamic Host Configuration Protocol server in responding to Dynamic Host Configuration Protocol renewals even if the central Dynamic Host Configuration Protocol server does not respond, thereby increasing service availability.

15. A method according to claim 14, characterized in that the method enables the network operator intermediate means to conceal the true Dynamic Host Configuration Protocol server address which increases network security as the Dynamic Host Configuration Protocol server becomes less exposed.

16. A method according to claim 13, characterized in that a Dynamic Host Configuration Protocol snooping feature enables the network operator intermediate means capturing a packet, whereby options contained in the Dynamic Host Configuration Protocol packet can be replaced by the network operator intermediate means filter for the purpose of communication with the Dynamic Host Configuration Protocol server.

17. A method according to claim 16, characterized in that an original packet before being replaced is stored, thus when receiving a reply from the Dynamic Host Configuration Protocol server, the network operator intermediate means reinstalling original options before forwarding the reply to the end-user equipment.

18. A method according to claim 13, characterized in that the central management database is able to policy decisions including at least the following:

if an address is granted at all at this time; and if configuration parameters should be installed in some other network element as a result of an end-user address request.

19. A method according to claim 18, characterized in that such configuration parameters are at least one of the following:

pocket filters;

rate limiting;

packet priority processing; and access control to multicast groups.

20. A method according to claim 13, characterized in that information about an assigned IP address, through the Dynamic Host Configuration Protocol enables the intermediate means to inject a host route to the assigned address into its routing table, whereby the host route can be announced by Interior Gateway Protocol or Exterior Gateway Protocol protocols to other routers, enabling them to learn a specific route to a local destination.

21. A method according to claim 13, characterized in that the parameter settings are enabling or disabling configuration at a specific dates/time.

22. A method according to claim 13, characterized in that said recordings in said management database record billing, security and other services that have been deployed to a customer at any given time.

23. A method according to claim 13, characterized in that the connection speed to the network at any given time is determined by said recordings.

24. A method according to claim 13, characterized in that an end-user equipment connects to said central managing database through an end-user interface to said templates in order to change the parameters for intermediate port settings.

* * * * *